United States Patent
Bell et al.

(10) Patent No.: US 7,516,679 B2
(45) Date of Patent: Apr. 14, 2009

(54) SENSOR MOUNTING DEVICE

(75) Inventors: Andrew David Bell, Carson City, NV (US); Raymond Verle Jensen, Gardnerville, NV (US)

(73) Assignee: General Electric Company, Schenectady, NY (US)

( * ) Notice: Subject to any disclaimer, the term of this patent is extended or adjusted under 35 U.S.C. 154(b) by 249 days.

(21) Appl. No.: 11/278,970

(22) Filed: Apr. 7, 2006

(65) Prior Publication Data

US 2007/0235613 A1    Oct. 11, 2007

(51) Int. Cl.
*G01N 15/00* (2006.01)
*G01L 1/00* (2006.01)
(52) U.S. Cl. .................................. 73/866.5; 73/855
(58) Field of Classification Search ............. 73/866.5, 73/855, 856; 248/685, 689, 309.1, 310, 316.7, 248/305
See application file for complete search history.

(56) References Cited

U.S. PATENT DOCUMENTS

| | | | |
|---|---|---|---|
| 5,381,243 A * | 1/1995 | Imamura ................... 358/471 |
| 6,315,263 B1 * | 11/2001 | Wang ......................... 248/694 |
| 6,927,682 B1 * | 8/2005 | Touhey et al. ............. 340/457.4 |
| 7,415,891 B2 * | 8/2008 | Santos et al. ................ 73/856 |

* cited by examiner

*Primary Examiner*—Hezron Williams
*Assistant Examiner*—Tamiko D Bellamy
(74) *Attorney, Agent, or Firm*—Sutherland Asbill & Brennan LLP

(57) ABSTRACT

A bracket for mounting a sensor. The bracket may include a base with a base loading mechanism for mating with the sensor, a first arm attached to the base, and a second arm adjustably attached to the base. The first arm may include a first arm loading mechanism for mating with the sensor.

18 Claims, 6 Drawing Sheets

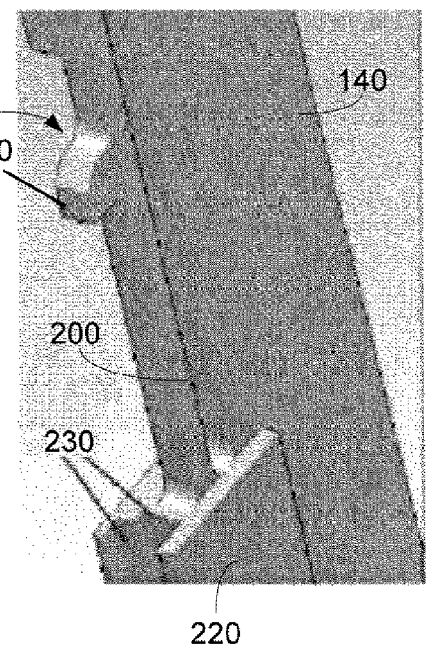
FIG. 5
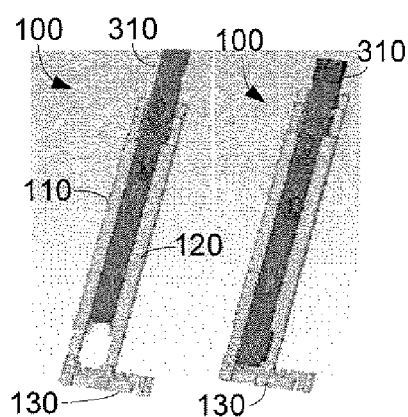
FIG. 6 a, b
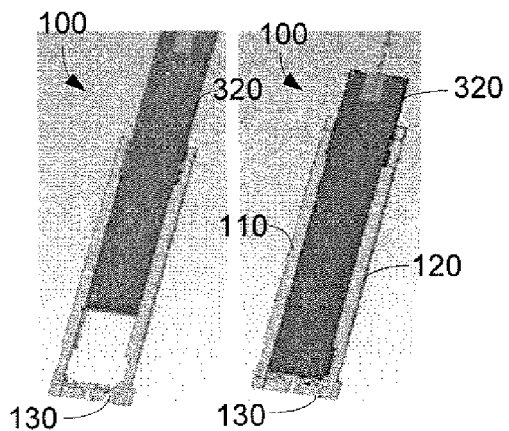
FIG. 7 a, b

SENSOR MOUNTING DEVICE

TECHNICAL FIELD

The present application relates generally to a mounting bracket and more particularly relates to an adjustable bracket for mounting a sensor to a generator stator or a similar device.

BACKGROUND OF THE INVENTION

Various types of sensors are used with electrical generators and similar types of equipment. For example, capacitive sensors generally may be attached directly to a wall of a stator with a permanent adhesive. If the sensor needs to be removed, however, a substantial amount of force may be required. The sensor can be damaged or destroyed during the removal process. Likewise, there is the risk of damaging the stator or the generator itself. Further, the information that might be gained from sensor analysis could be lost or corrupted.

There is a desire therefore for a mounting device and a mounting method that would securely position a sensor in place adjacent to the stator wall or similar locations while allowing easy removal of the sensor if required. The device and the method preferably should provide flexibility for different types and sizes of sensors as may be desired.

SUMMARY OF THE INVENTION

The present application thus describes a bracket for mounting a sensor. The bracket may include a base with a base loading mechanism for mating with the sensor, a first arm attached to the base, and a second arm adjustably attached to the base. The first arm may include a first arm loading mechanism for mating with the sensor.

The base, the first arm, and the second arm may be made out of an ozone resistant thermoplastic. The first arm may be adjustably attached to the base. The second arm may include a second arm loading mechanism for mating with the sensor. The first arm may include a first arm mating base for mating with the base. The base may include a first mating area to accommodate the first arm mating base. The second arm may include a second arm mating base for mating with the base. The base may include a number of second mating areas to accommodate the second arm mating base.

The second arm mating base may include a pair of extended flanges and an indent. The second mating areas each may include an indent and a boss to mate with the flanges and the indent of the second arm mating base. The first arm loading mechanism may include a tab positioned on the first arm and an aperture within the first arm located about the tab. The second arm loading mechanism may include a tab positioned on the second arm and an aperture within the second arm located about the tab. The base loading mechanism may include a tab positioned on the base and an aperture within the base located about the tab. The first arm and the second arm may include a tab thereon.

The first arm and the second arm may include a sleeve thereon. The sleeve may include a number of slots therein. The bracket further may include a cable guide attached thereto.

The present application further describes a method for attaching a sensor to a bracket having a base, a first arm, and a second arm. The method may include positioning the second arm within the base so as to match the size of the sensor, sliding the sensor along the first arm and the second arm, loading the sensor into the base, locking the sensor into the first arm, and locking the sensor into the second arm.

The present application further describes a bracket for mounting a sensor about a generator stator. The bracket may include a first arm with a first arm first loading mechanism and a first arm second loading mechanism for mating with the sensor. The first arm second loading mechanism may include a first cantilevered arm. The bracket also may include a second arm with a second arm first loading mechanism and a second arm second loading mechanism for mating with the sensor. The second arm second loading mechanism may include a second cantilevered arm.

These and other features of the present application will become apparent to one of ordinary skill in the art upon review of the following detailed description when taken in conjunction with the drawings and the appended claims.

BRIEF DESCRIPTION OF THE DRAWINGS

FIG. 2C is a perspective view of the mounting arm of FIG. 2A.

FIG. 5 is a perspective view of a mounting arm.

FIG. 6A is a perspective view of a sensor positioned within the mounting bracket.

FIG. 6B is a perspective view of a sensor positioned within the mounting bracket.

FIG. 7A is a perspective view of a sensor positioned within the mounting bracket.

FIG. 7B is a perspective view of a sensor positioned within the mounting bracket.

DETAILED DESCRIPTION

Figure 1:
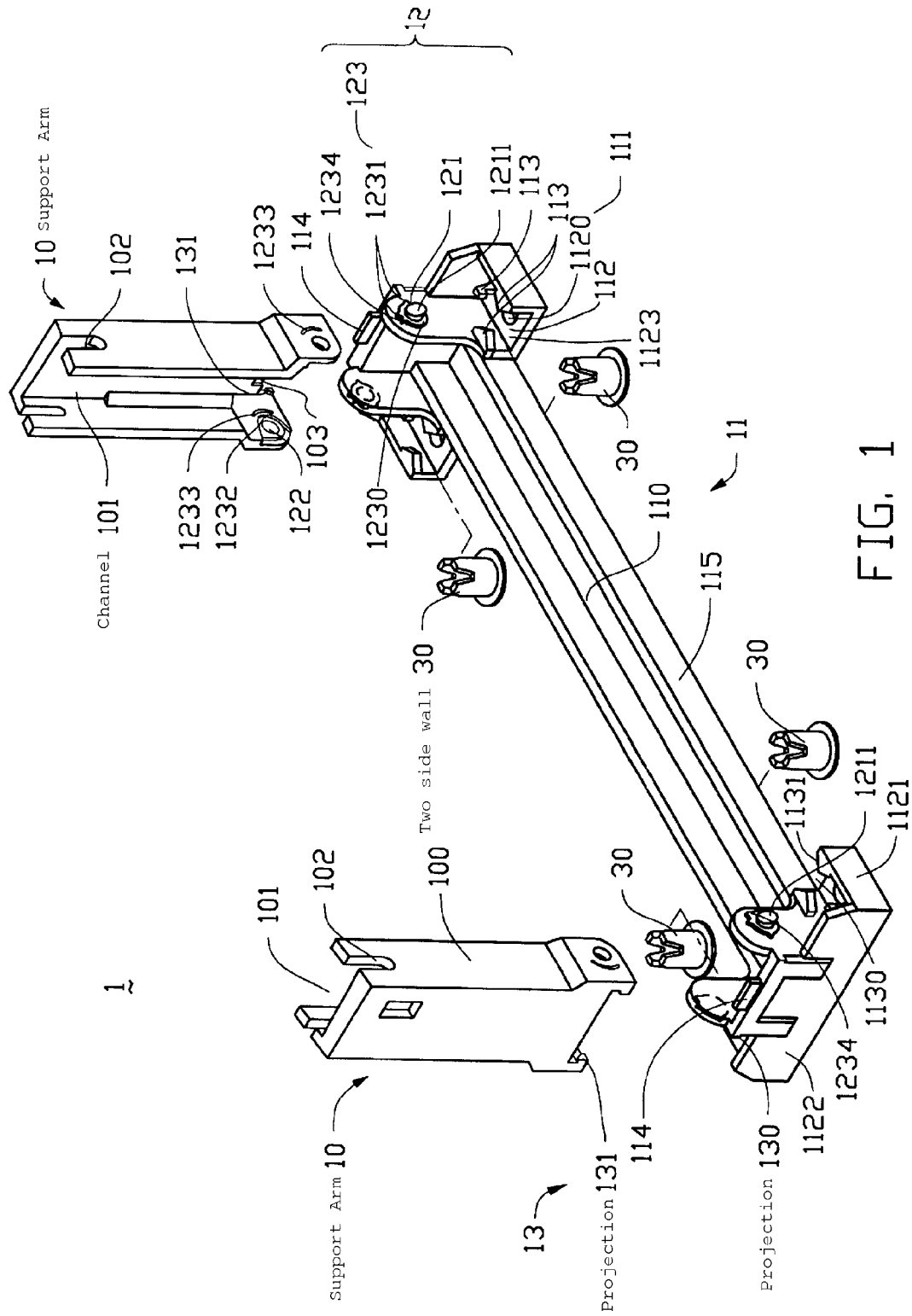
FIG. 1 is a perspective view of a mounting bracket for a stator wall as is described herein.

Referring now to the drawings, in which like numerals refer to like elements throughout the several views, FIG. 1 through FIGS. 4A-C show a mounting bracket 100 as is described herein. As is shown, the mounting bracket 100 includes a first arm 110, a second arm 120, and a base 130. The components of the mounting bracket 100 may be made out of a thermoplastic material that, while being substantially rigid, has a certain amount of springiness or flexibility. For example, an ozone resistant thermoplastic like PEEK (Polyetheretherketone) and similar types of materials may be used. The components of the mounting bracket 100 may be made by injection molding or similar type of manufacturing techniques. The mounting bracket 100 may be permanently attached to the stator or to other locations via an adhesive or other types of connection means. All or some of the components of the mounting bracket 100 may be attached to the stator wall or to similar locations.

Figure 2A:
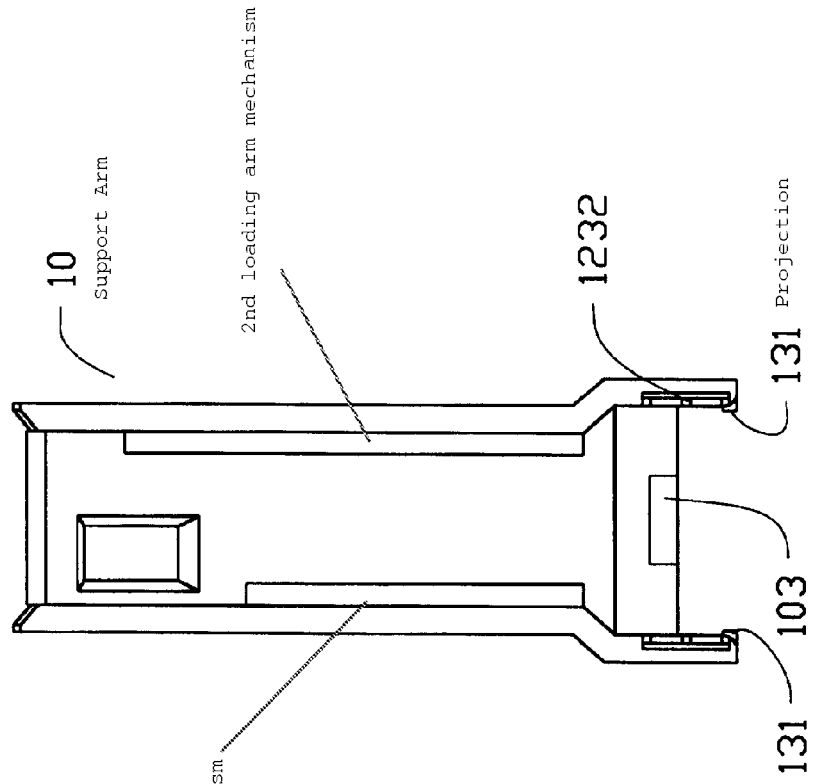
FIG. 2A is a side plan view of a first mounting arm of the mounting bracket of FIG. 1.
Figure 2B:
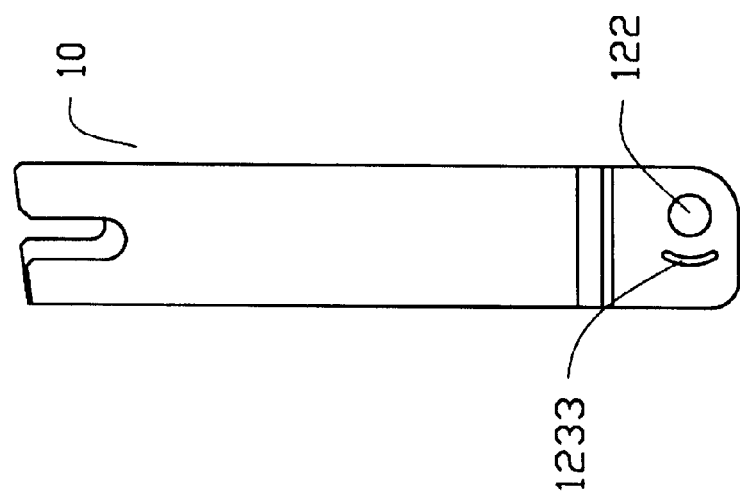
FIG. 2B is a side plan view of the mounting arm of FIG. 2A.

The first arm 110 is shown in FIGS. 2A-C. The first arm 110 may be a unitary element or the components described below may be separate elements joined by conventional methods.

As is shown, the first arm 110 includes a rail 140. The rail 140 is largely rectangular in shape. The rail 140 has a mating base 150 at one end. The mating base 150 is sized to mate with the base 130 as will be described in more detail below. As such, the mating base 150 has a pair of extended flanges 160 and an indent 170 so as to mate with a similar structure on the base 130. Any type of connection device or means may be used herein.

Positioned on the other end of the rail 140 may be a loading mechanism 180. The loading mechanism 180 includes a spring loaded tab 190. The tab 190 may extend outward from the rail 140. The tab 190 may be sized so as to mate with a notch in a specific type of sensor as will be described in more detail below. The tab 190 may be positioned on the rail 140 adjacent to an elongated aperture 200. The loading mechanism 180 thus can be considered spring loaded given the nature of the material used in the rail 140 and the positioning of the tab 190 adjacent to the aperture 200. Positioned along the rail 140 between the mounting base 150 and the loading mechanism 180 may be a sleeve 220. The sleeve 220 may have a number of slots 230 positioned therein. The slots 230 may be sized so as to accommodate sensors of different thickness as will be described in more detail below. Any size or number of slots 230 may be used herein.

Figures 3A, 3B, 3C:
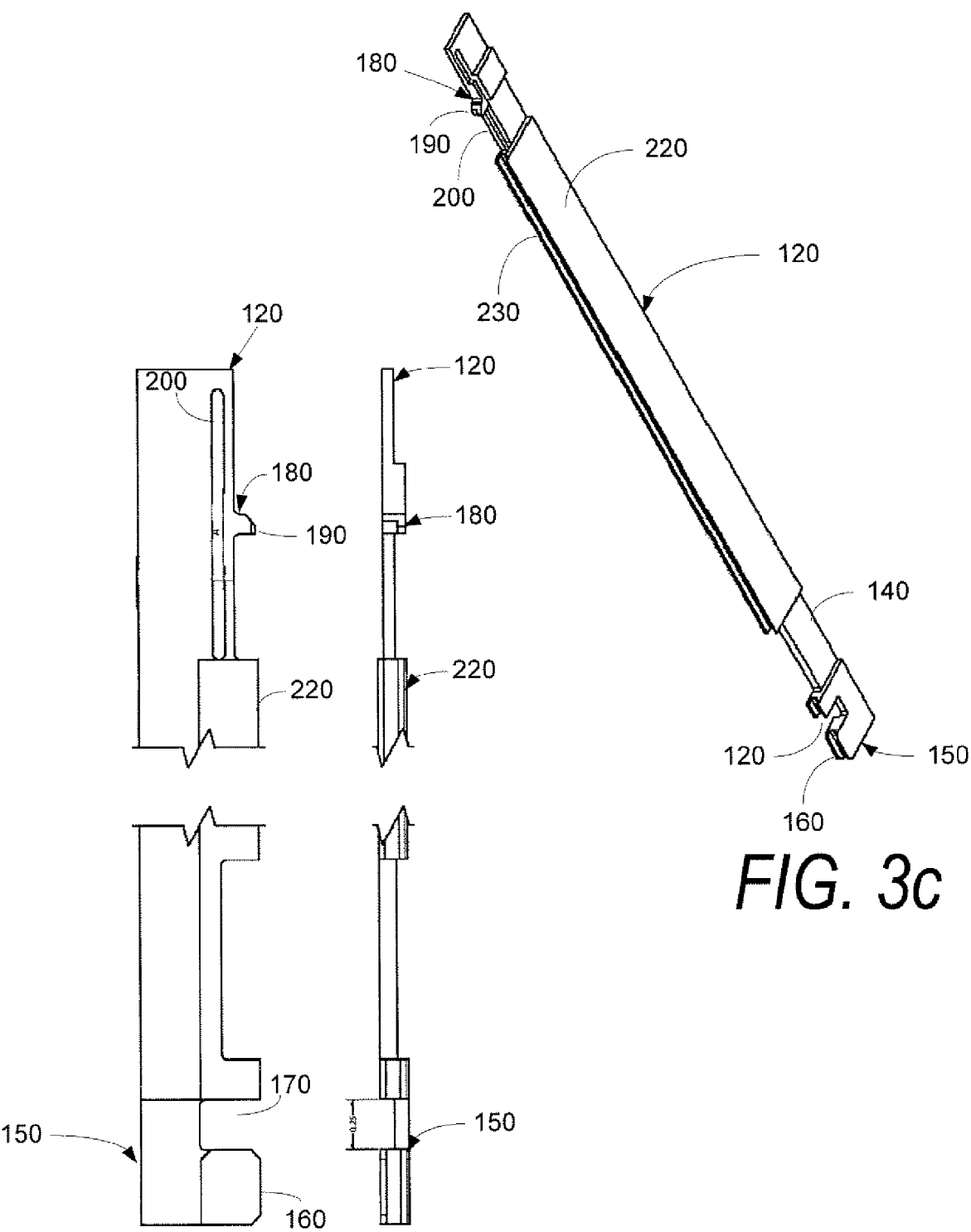
FIG. 3A is a side plan view of a second mounting arm of the mounting bracket of FIG. 1.
FIG. 3B is a side plan view of the mounting arm of FIG. 3A.
FIG. 3C is a perspective view of the mounting arm of FIG. 3A.

FIGS. 3A-C show the second arm 120. The second arm 120 may be largely identical to the first arm 110, but with a mounting base 150 having a different geometry so as to accommodate the geometry of the base 130. Specifically, the flanges 160 and the indent 170 may be configured to mate with the base 130 as described in more detail below.

Figure 4A:
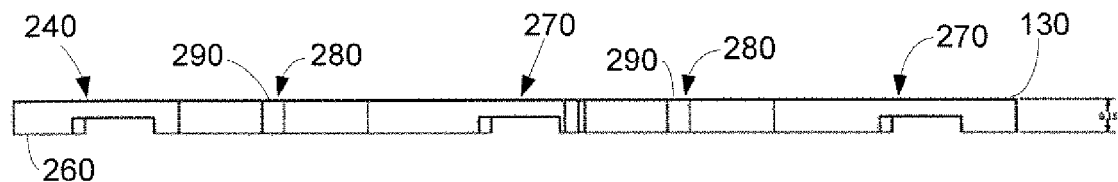
FIG. 4A is a side plan view of a mounting base of the mounting bracket of FIG. 1.
Figure 4B:
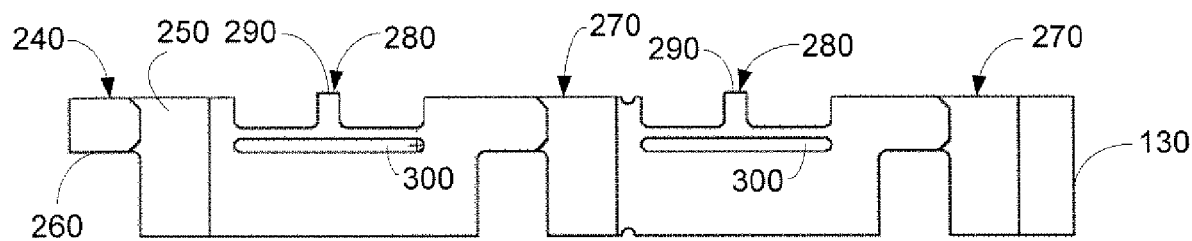
FIG. 4B is a side plan view of the mounting base of FIG. 4A.
Figure 4C:
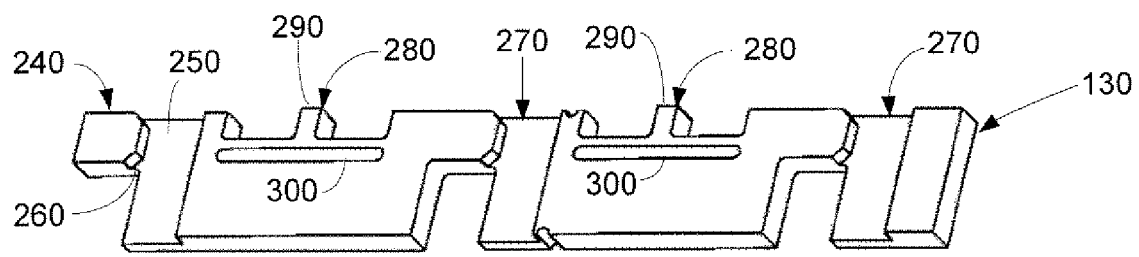
FIG. 4C is a perspective view of the mounting base of FIG. 4A.

FIGS. 4A-C show the base 130. The base 130 has a first mating area 240 to accommodate the mating base 150 of the first arm 110. As such, the first mating area 240 has an indent 250 and a boss 260 designed to mate with the flanges 160 and the indent 170 of the mating base 150. Alternatively, the first arm 110 may be permanently attached to the base 130.

The base 130 further includes a number of second mating areas 270. The second mating areas 270 are designed to mate with the mating base 150 of the second arm 120. Although two second mating areas 270 are shown, any number may be used herein. The second mating areas 270 likewise have an indent 250 and a boss 260 configured so as to mate with the flanges 160 and the indent 170 of the mating base 150 of the second arm 120. By having several second mating areas 270, the mounting bracket 100 as a whole can accommodate sensors of different widths and sizes. Likewise, one of the mating areas 240, 270 may be adjustable by, for example, a slot and groove configuration or similar methods.

The first and the second mating areas 240, 260 have different configurations so as to ensure that the arms 110, 120 are not misassembled in the field. The arms 110, 120, however, also could be attached to the base 130 by less complex means such as simple protrusions and mating holes. Any type of mating means may be used herein. Likewise, as described below, the base 130 could be eliminated.

The base 130 also includes one or more loading mechanisms 280 similar to that described above. The loading mechanisms 280 may be spring loaded either by geometry and the associated material properties or by a physical spring. The loading mechanisms 280 may include a tab 290 positioned therein. The tab 290 may be sized according to a notch in the intended sensor. Any number of loading mechanisms 280 may be used herein.

FIGS. 6A-B show use of the mounting bracket 100 with a sensor 310. Due to the size of the sensor 310, the second arm 120 is positioned in the first of the second mating areas 270 of the base 130. The sensor 310 is slid along the slots 230 of the sleeve 220 on the rails 140 of the first and second arms 110, 120. The sensor 310 is pushed adjacent to the base 130 such that the tabs 290 of the base 130 engage and positively load the sensor 310. The tabs 190 of the arms 110, 120 engage similarly shaped notches along the length of the sensor 310 such that the sensor is firmly locked into place within the mounting bracket 100 adjacent to the stator or other location. When it is desired to remove the sensor 310 from the mounting bracket 100, the tabs 190 may be disengaged from the sensor 310 by pushing the tabs 190 about the aperture 200. The sensor 310 then may be slid out of the mounting bracket 100.

FIGS. 7A-B show the use of the mounting bracket 100 with a larger sensor 320. Given the width of the sensor 320, the second arm 120 is positioned about the second of the second mating areas 270. A different groove 230 also may be used to accommodate the size of the sensor 320.

Figure 8:
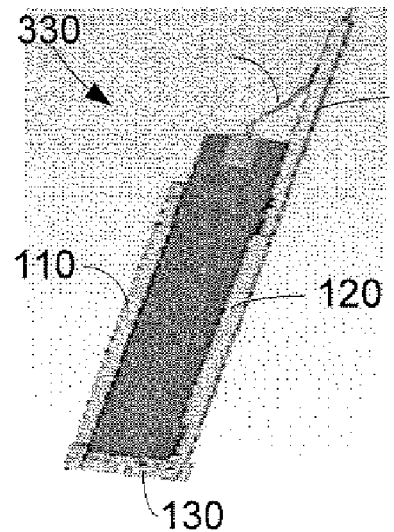
FIG. 8 is a perspective view of the mounting bracket with a sensor and a cable exit guide.

FIG. 8 shows a further embodiment of a mounting bracket 330. In this embodiment, the mounting bracket 330 may be largely identical to the mounting bracket 100 described above with the addition of a cable guide 340. The cable guide 340 may be attached to one of the arms 110, 120 so as to position a sensor cable 350 therein. The cable guide 340 may have any desired length.

Figure 9:
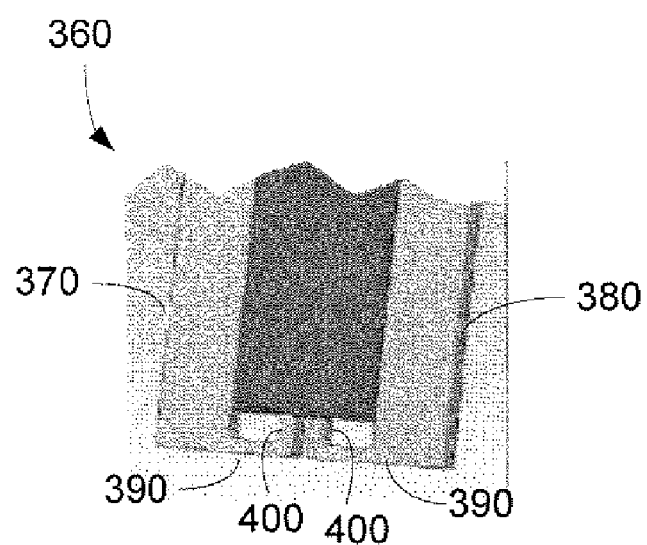
FIG. 9 is a perspective view of an alternative embodiment of the mounting bracket.

FIG. 9 shows a further embodiment of a mounting bracket 360. In this embodiment, the mounting bracket 360 has a first arm 370 and a second arm 380 that are largely similar to the arms 110, 120 described above. Instead of a mating base 130, however, each arm 370, 380 has a mating arm 390 that extends into a tab 400. The mating arms 390 act in a largely cantilevered fashion so as to provide a spring loaded action to the tab 400.

It should be apparent that the foregoing relates only to the preferred embodiments of the present application and that numerous changes and modifications may be made herein by one of ordinary skill in the art without departing from the general spirit and scope of the invention as defined by the following claims and the equivalents thereof.

We claim:

1. A bracket for mounting a sensor, comprising:
   a base;
   the base comprising a base loading mechanism for mating with the sensor, the base loading mechanism configured to apply a load to the sensor;
   a first arm attached to the base;
   the first arm comprising a first arm loading mechanism for mating with the sensor, the first arm loading mechanism being separate from the base loading mechanism, the first arm loading mechanism configured to apply a load to the sensor; and
   a second arm adjustably attached to the base.

2. The bracket for mounting a sensor of claim 1, wherein the first arm is adjustably attached to the base.

3. The bracket for mounting a sensor of claim 1, wherein the second arm comprises a second arm loading mechanism for mating with the sensor.

4. The bracket for mounting a sensor of claim 1, wherein the base, the first arm, and the second arm comprise an ozone resistant thermoplastic.

5. The bracket for mounting a sensor of claim 1, wherein the first arm comprises a first arm mating base for mating with the base.

6. The bracket for mounting a sensor of claim 5, wherein the base comprises a first mating area to accommodate the first arm mating base.

7. The bracket for mounting a sensor of claim 1, wherein the second arm comprises a second arm mating base for mating with the base.

8. The bracket for mounting a sensor of claim 7, wherein the base comprises a plurality of second mating areas to accommodate the second arm mating base.

9. The bracket for mounting a sensor of claim 8, wherein the second arm mating base comprises a pair of extended flanges and an indent.

10. The bracket for mounting a sensor of claim 9, wherein the plurality of second mating areas each comprises an indent and a boss to mate with the flanges and the indent of the second arm mating base.

11. The bracket for mounting a sensor of claim 1, wherein the first arm loading mechanism comprises a tab positioned on the first arm and an aperture within the first arm located about the tab.

12. The bracket for mounting a sensor of claim 3, wherein the second arm loading mechanism comprises a tab positioned on the second arm and an aperture within the second arm located about the tab.

13. The bracket for mounting a sensor of claim 1, wherein the base loading mechanism comprises a tab positioned on the base and an aperture within the base located about the tab.

14. The bracket for mounting a sensor of claim 1, wherein the first arm and the second arm comprise a loading tab thereon.

15. The bracket for mounting a sensor of claim 1, wherein the first arm and the second arm comprise a sleeve thereon.

16. The bracket for mounting a sensor of claim 15, wherein the sleeve comprises a plurality of slots therein.

17. The bracket for mounting a sensor of claim 1, further comprising a cable guide attached thereto.

18. A bracket for mounting a sensor about a generator stator, comprising:

a first arm;

the first arm comprising a first arm first loading mechanism for mating with the sensor; and the first arm comprising a first arm second loading mechanism for mating with the sensor;

the first arm second loading mechanism comprising a first cantilevered arm; and a second arm;

the second arm comprising a second arm first loading mechanism for mating with the sensor; and the second arm comprising a second arm second loading mechanism for mating with the sensor;

the second arm second loading mechanism comprising a second cantilevered arm;

wherein each of the loading mechanisms is configured to apply a load to the sensor.

* * * * *